(12) United States Patent
Papson et al.

(10) Patent No.: US 9,641,220 B2
(45) Date of Patent: May 2, 2017

(54) ALTERNATIVE POWER SOURCE FOR NETWORK PROTECTOR RELAY

(71) Applicant: DGI Creations, LLC, Raleigh, NC (US)

(72) Inventors: John C. Papson, Melville, NY (US); John R. Weber, Jr., Fort Salonga, NY (US)

(73) Assignee: DGI Creations, LLC, Raleigh, NC (US)

( * ) Notice: Subject to any disclaimer, the term of this patent is extended or adjusted under 35 U.S.C. 154(b) by 551 days.

(21) Appl. No.: 14/193,754

(22) Filed: Feb. 28, 2014

(65) Prior Publication Data

US 2015/0248981 A1 Sep. 3, 2015

(51) Int. Cl.
*H04B 3/56* (2006.01)
*H02J 13/00* (2006.01)

(52) U.S. Cl.
CPC ............ *H04B 3/56* (2013.01); *H02J 13/0072* (2013.01); *H04B 2203/5466* (2013.01); *H04B 2203/5483* (2013.01); *Y02B 90/2646* (2013.01); *Y02B 90/2692* (2013.01); *Y02E 60/7892* (2013.01); *Y04S 40/125* (2013.01); *Y04S 40/146* (2013.01); *Y10T 307/747* (2015.04)

(58) Field of Classification Search
CPC ........................... H04B 3/56; H04B 2203/5466
See application file for complete search history.

(56) References Cited

U.S. PATENT DOCUMENTS

| 2,110,676 | A |   | 3/1936  | Prince |          |
|-----------|---|---|---------|-----------|----------|
| 2,110,673 | A |   | 11/1936 | McConnell |          |
| 2,856,566 | A |   | 12/1956 | Fornwalt  |          |
| 4,757,416 | A |   | 7/1988  | Wilkerson |          |
| 4,788,619 | A |   | 11/1988 | Wilkerson |          |
| 4,845,594 | A |   | 7/1989  | Wilkerson |          |
| 5,014,513 | A |   | 5/1991  | Wilkerson |          |
| 5,309,312 | A |   | 5/1994  | Wilkerson |          |
| 5,959,819 | A | * | 9/1999  | Johnson ................... H02H 1/06 361/79 |
| 6,018,203 | A | * | 1/2000  | David ........................ H02J 3/14 307/18 |

(Continued)

OTHER PUBLICATIONS

Network Protector Instruction Manual—Type 137NP—800 to 3500 Amperes, Mar. 2, 2001 (as discerned from PDF metadata), pp. 1-53, Richards Manufacturing Company, Sales, Inc., Irvington, NJ, USA. (NPL uploaded in three overlapping files because of PTO file size limits) (p. 39 shows a prior art wiring schematic for a network protector relay).

(Continued)

*Primary Examiner* — Thienvu Tran
*Assistant Examiner* — Pinping Sun
(74) *Attorney, Agent, or Firm* — Kevin E Flynn; Flynn IP Law

(57) ABSTRACT

A relay for control of a network protector located on a low voltage side of a transformer with a set of three phases, the relay having at least one route for power to be provided to the relay from at least one of the set of three phases taken from a transformer side of the network protector so that the relay may have power and be functional before the network protector is closed to provide power into a dead network.

10 Claims, 8 Drawing Sheets

(56) References Cited

U.S. PATENT DOCUMENTS

| | | | |
|---|---|---|---|
| 6,407,897 B1* | 6/2002 | Yanniello | H01T 4/08 |
| | | | 361/56 |
| 7,242,729 B1 | 7/2007 | Heistermann | |
| 7,265,960 B2* | 9/2007 | Zipagan | H02H 3/04 |
| | | | 361/115 |
| 7,366,773 B2 | 4/2008 | Weber | |
| 7,808,128 B1 | 10/2010 | Weber | |
| 7,826,538 B1 | 11/2010 | Weber | |
| 7,987,058 B1 | 7/2011 | Weber | |
| 8,254,072 B2* | 8/2012 | Meehleder | H02H 1/06 |
| | | | 361/62 |
| 2006/0072268 A1* | 4/2006 | Kang | G06F 1/30 |
| | | | 361/92 |
| 2007/0002596 A1* | 1/2007 | Kenny | H02M 1/10 |
| | | | 363/89 |

OTHER PUBLICATIONS

Network Protector Instruction Manual—Type 316NP, Dec. 18, 2002, 26 pages, Richards Manufacturing Sales, Inc., Irvington, NJ, United States.

SEL-632 Low-Voltage Network Protector Relay—Reliable Network Protector Engineered for the Harshest Environments, Feb. 15, 2010, 12 pages, Schweitzer Engineering Laboratories, Pullman, WA, United States (See FIG. 3 for dual power sources).

Instruction for the Cutler-Hammer® Type MPCV Network Protector Relay—Instruction Bulletin, Sep. 2004, 32 pages, Instruction Bulletin IB02402001E, Eaton Electrical Inc., Moon Township, PA, United States.

* cited by examiner

ALTERNATIVE POWER SOURCE FOR NETWORK PROTECTOR RELAY

BACKGROUND

Field of the Disclosure

This disclosure relates generally to the field of remote monitoring of the conditions of electric power network components, particularly transformers. Parameters and status flags for a transformer may be communicated by anyone of a number of methods such as power line carrier (PLC), which introduces a high frequency analog signal onto a power cable used to convey power in a portion of an electric distribution network. Information about the various transformers in a given electrical distribution network may be aggregated and monitored at a central location.

While the present application may be implemented to use any conventional method of conveying information from a remote location to a central location, it will be illustrated in the context of an environment using power line carrier. Power line carrier is used by some information collection systems to send measurements and other information about the operation of a transformer, related equipment, and conditions in the vicinity of the transformer such as in a vault. The information is sent in a data record over one of the three phases of the feeder bus to a centralized location such as a switchyard where the information is pulled from the phase of the feeder bus by a coil or other means and provided to a receiver which also receives information about the operation of other distribution transformers.

Electrical Distribution Network.

FIG. 1 introduces the environment relevant to the present disclosure. A portion of an electrical distribution network is shown as network 100. Network 100 has feeder bus 104, feeder bus 108, and feeder bus 112. A representative voltage for operation of these feeder buses may be 13 Kv but other systems may operate at 27 Kv, 34 Kv or some other voltage. The power on these three buses is provided to a set of local distribution networks 116 (local networks") to serve loads 120, 124, and 128. The voltage on these local distribution networks is apt to be 120 volts, but it could be 277 volts, 341 volts or some other voltage. In some cases these loads represent a building or even a portion of a very large building. Depending on the amount of load, the local distribution network may be coupled to one, two, or three feeder buses (104, 108, and 112). Even when the load can consistently be serviced by just one feeder bus, a desire for reliability leads to providing a redundant path for providing service in case of equipment failure, scheduled maintenance, load balancing, or other needs.

The local networks 116 are coupled to the feeder buses 104, 108, and 112 through transformers 150 and related equipment. The illustrated network shown in FIG. 1 has three separate local networks 116 which serve loads 120, 124, and 128. These three separate local networks 116 can be provided at any given time with power flowing through zero, one, or more than one transformer 150. The transformers convert the relatively higher voltage on the primary side 154 of the transformers 150 to the low voltage on the secondary side 158 of the transformers 150.

The transformers 150 have transformer breakers 162 on the primary side to isolate the transformers 150 from the feeder buses. The transformers 150 have network protectors 166 on the secondary side 158 of the transformers 150 to isolate the transformers 150 from the local networks 116 as needed to protect the transformers from current flowing from the distribution networks (secondary side) to the primary side 154 of the transformers. To have current flowing from the secondary side to the primary side of a transformer is undesirable. This undesirable current flow is known as "back feed" or "reverse power flow". Detecting reverse power flow reliably is the focus of the present application.

Additionally, some networks include sets of fuse links 170 between the network protectors 166 and the local networks 116. Some networks include sets of primary fuse links 174 between the transformer breakers 162 and the feeder buses 104, 108, and 112.

The feeder buses 104, 108, and 112 can be isolated by a set of substation breakers 204 from the transmission network 208 which is ultimately connected to a set of power sources represented here by turbine 212.

Network Protectors and Back Feed.

Electric utilities use network protectors 166 to automatically connect and disconnect the network transformer 150 associated with a particular network protector 166 from the local network 116. Typically, the network protector is set to close when the voltage differential and phase angle are such that the transformer 150 will supply power to the local network 116. In other words, the net current flow across the transformer 150 will be from the primary side 154 to the secondary side 158 and towards the loads (such as 120, 124, and 128). Network protectors 166 are supposed to open up (trip) to prevent back feed across a transformer (from secondary side 158 to the primary side 154). As mentioned below, the network protector 166 may have a delay that keeps the network protector 166 from opening during a transient back feed. Typically, the network protector 166 is contained in a submersible enclosure which is bolted to the network transformer and placed with the transformer in an underground vault.

Remote Monitoring of Electrical Distribution Network.

FIG. 1 shows a small portion of the network which may have more feeder buses and many more local networks 116 providing power to many more loads. These loads may be distributed around a portion of a city. The various transformers 150 may be in vaults near the various loads. Thus it is convenient to aggregate information about many different transformers at a monitoring station 260. The information about the transformers may be communicated using any known communication media including fiber optic fiber, wired communication including communication routed for at least a portion of the trip over telephone or data communication lines, wireless communication or power line carrier. Power line carrier is a frequent choice as it can be convenient to inject analog signals onto the power lines so that the analog signals can be picked off by pick-up coils 230 at the substation and fed to a receiver 220. While FIG. 1 shows only one transmitter 216, it is understood that a series of transmitters, one for each monitored transformer would be present in an actual network, and the transmitters would communicate through various communication routes possibly including power line carrier to various pick-up coils 230 connected to one or more receivers and the various receivers for a given portion of the distribution network would be in data communication with a monitoring station 260.

The precise way that the analog signals are removed from the power line is not relevant to the scope of the present disclosure, but one typical means for acquiring the analog carrier signal is through a pick-up coil 230 such as a Rogowski air coil as is known in the art. These analog signals are often in the frequency range of 40 KHz to 70 KHz which is much higher than the frequency of the power being distributed over the network. (For example one common frequency for power grids is 60 Hertz although other frequencies are used throughout the world and can be used in connection with the present disclosure).

While Phase Shift Keying is a known method for increasing the information density in a data transmission, the details of Phase Shift Keying are not relevant to an understanding of the present disclosure.

One suitable location for injecting the analog signal containing information about the operation of a transformer and related equipment is on the secondary side 158 of the transformer between the transformer 150 and the network protector 166. Transmitter 216 is shown in FIG. 1 to illustrate this location but it is understood that each transformer 150 would most likely have its own transmitter. Placement of transmitter 216 in this location allows for the injection of the analog signal onto the relatively low voltage, secondary side of the transformer 150. Traversing the transformer 150 from secondary side 158 to primary side 154 provides only a slight attenuation of the high frequency carrier signal used in power line carrier communication. One data communication path for the power line carrier signal is from transmitter 216 on the secondary side 158 of the transformer 150 to the primary side 154, then through the transformer breaker 162, primary fuse 174, feeder bus 104, pick-up coil 230 and ultimately to receiver 220. This data path is not impacted by the opening of the network protector 166 or the relevant fuse link 170. The data collected by one or more receivers 220, 222, and 224 may be fed to a monitoring station 260 which allows an operator to see the current state of various components and look at trends and other representations of data over time in order to monitor, manage, and troubleshoot the electrical distribution network.

Commonly assigned U.S. Pat. No. 7,366,773 teaches Alternative Communication Paths for Data Sent Over Power Line Carrier to make it possible for the data to reach the receiver even if one of the components along a primary communication path is open and not conducting data.

FIG. 2 highlights just a portion of the network shown in FIG. 1, which is a transformer 150, with secondary side 158 and a transmitter 216 which may be connected to at least one phase on the secondary side 158 of the transformer 150. The transformer 150 is isolated from the network side 118 of the network protector 166 by the network protector 166. While FIG. 1 did not go into this level of detail, the network protector 166 may be nothing more than a large three-pole single throw contractor that can handle large current flows. The logic controlling the network protector 166 is found in a relay 168. Connection 304 represents that one or more control connections between the relay 168 and the network protector 166. The relay 168 was an electro-mechanical device for many years and now in many instances the relay 168 is actually a microprocessor based device. In both cases, the relay 168 was connected to a variety of inputs and either opened the network protector 166 or prevented the network protector 166 from closing when the conditions across the network protector 166 made it appropriate for the network protector 166 to be open. Historically, the relay 168 obtained power for its operation from one or more phases on the network side 118 of the network protector 166. While it may seem redundant to obtain power from two or three phases instead of one, those of skill in the art know that obtaining power from three phases has the benefits of:

Making power available even if a network side fuse is out and

After rectifying the three phases, the combined power provided to the relay is suitable for use by the relay.

Connection 306 shows that power is shared between the relay 168 and the transmitter 216. Connection 302 shows a data communication link between the relay 168 and the transmitter 216. To avoid undue clutter, this data link will not be shown in subsequent drawings. In some instances the functionality of the relay and transmitter may be within one housing.

Dead Network

Returning to FIG. 1, if none of the transformers 150 and paired network protectors 166 are providing power to a given local network 116, then the network is said to be dead as it has no power on the network side 118 of the network protectors 166. Thus, the relay 168 (FIG. 2) does not get power from any phase of the local network 116. Prior art solutions with a microprocessor based relay 168 lacked power in the relay 168 when the network was dead.

Thus, when a relay 168 lost power as none of the transformers 150 were providing power to the local network 116, the relay 168 sends an instruction to close the network protector 166 (which may be closed already). Normally, the local network 116 is dead because no power is reaching the primary side 154 of the transformers 150, most likely because a relevant breaker such as transformer breaker 162 or substation breaker 204 is open. Once the power is returned to the primary side 154 of the first transformer 150 to receive power, then power can flow through that transformer 150 to the secondary side 158 of the transformer 150 and through the previously closed network protector 166 to provide power to the local network 116 and thus to all network protector relays 168 that control network protectors 166 connected to that local network 116. After a delay, the relays 168 become capable of exercising control of their network protectors 166 based on local data or in some instances from external communication. The delay in reaching full functionality of the energized relay comes from the need for the microprocessor to go through a boot up process which takes on the order of magnitude of seconds.

While the microprocessor in the relay 168 is booting, the network protector 166 does not get the benefit of the logic in the relay 168 which might otherwise detect a condition that merits opening the network protector 166 such as back feed, or other problems. As the transmitter 216 is receiving power from the relay 168, the transmitter 216 is without power when the relay 168 is without power. Thus, the transmitter 216 cannot be used to transmit any data when the relay 168 does not have power. Some transmitters 216 can serve a second purpose as a receiver to receive information from a remote location, including commands to provide to the relay 168. The relay 168 thus cannot receive commands via the transmitter 216 when the relay 168 is without a source of power during a dead network.

Process to De-Energize and Re-Energize.

The process of de-energizing and re-energizing a network is set forth in FIG. 3.

Step 2004—the last transformer 150 providing power to load 120 through local network 116 is isolated from power by the opening of transformer breaker 162.

Step 2008—as the local network is now isolated with no transformer 150 providing power to the local network 116, the last act of each of the relays 168 are to send a command to close the network protector 166 associated with that relay 168.

Step 2012—provide power to at least one transformer 150. The transformer 150 provided power first, may or may not be the last transformer 150 to be isolated.

Step 2016—as the power passes through the transformer 150 to the secondary side 158 of the transformer 150, the power continues through the previously closed network protector 166 to energize the local network 116.

Step 2020—using power obtained from the network side 118 of the network protectors 166, the relays 168 associated with the network protectors 166 for the transformers 150 associated with the local network 116 begin to boot and become operational.

Thus, with a relay 168 that draws power only from the local network side 118 of the network protector 166, the relay 168 must operate with a normally closed status when not powered so that the process can provide power through a closed network protector 166 to the local network 116 to power up the relay 168.

SUMMARY

Aspects of the teachings contained within this disclosure are addressed in the claims submitted with this application upon filing. Rather than adding redundant restatements of the contents of the claims, these claims should be considered incorporated by reference into this summary.

This summary is meant to provide an introduction to the concepts that are disclosed within the specification without being an exhaustive list of the many teachings and variations upon those teachings that are provided in the extended discussion within this disclosure. Thus, the contents of this summary should not be used to limit the scope of the claims that follow.

Other systems, methods, features, and advantages of the disclosed teachings will be or will become apparent to one with skill in the art upon examination of the following figures and detailed description. It is intended that all such additional systems, methods, features and advantages be included within the scope of and be protected by the accompanying claims.

BRIEF DESCRIPTION OF THE FIGURES

The disclosure can be better understood with reference to the following figures. The components in the figures are not necessarily to scale, emphasis instead being placed upon illustrating the principles of the disclosure. Moreover, in the figures, like reference numerals designate corresponding parts throughout the different views.

DETAILED DESCRIPTION

Figure 2:
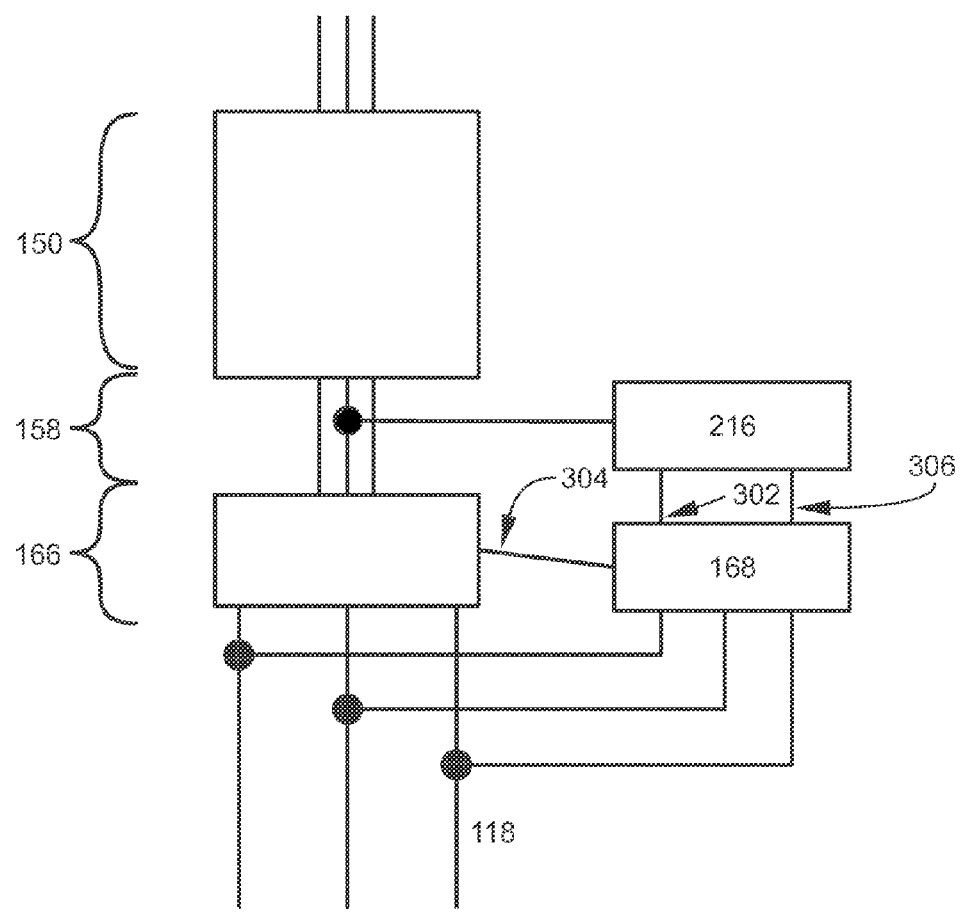
FIG. 2 shows a portion of a prior art network including the relay that controls a network protector.
Figure 3:
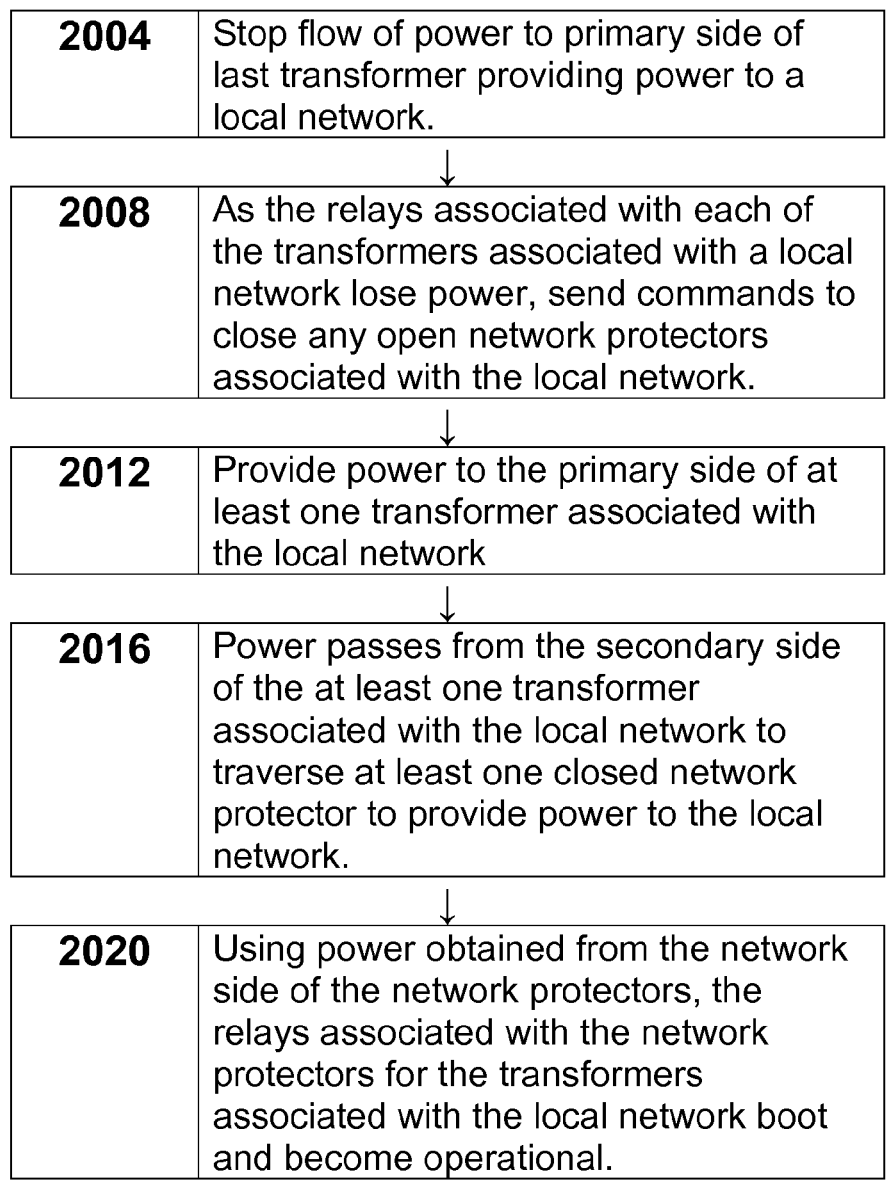
FIG. 3 is a flow chart showing the prior art process of de-energizing and re-energizing a local network.
Figure 4:
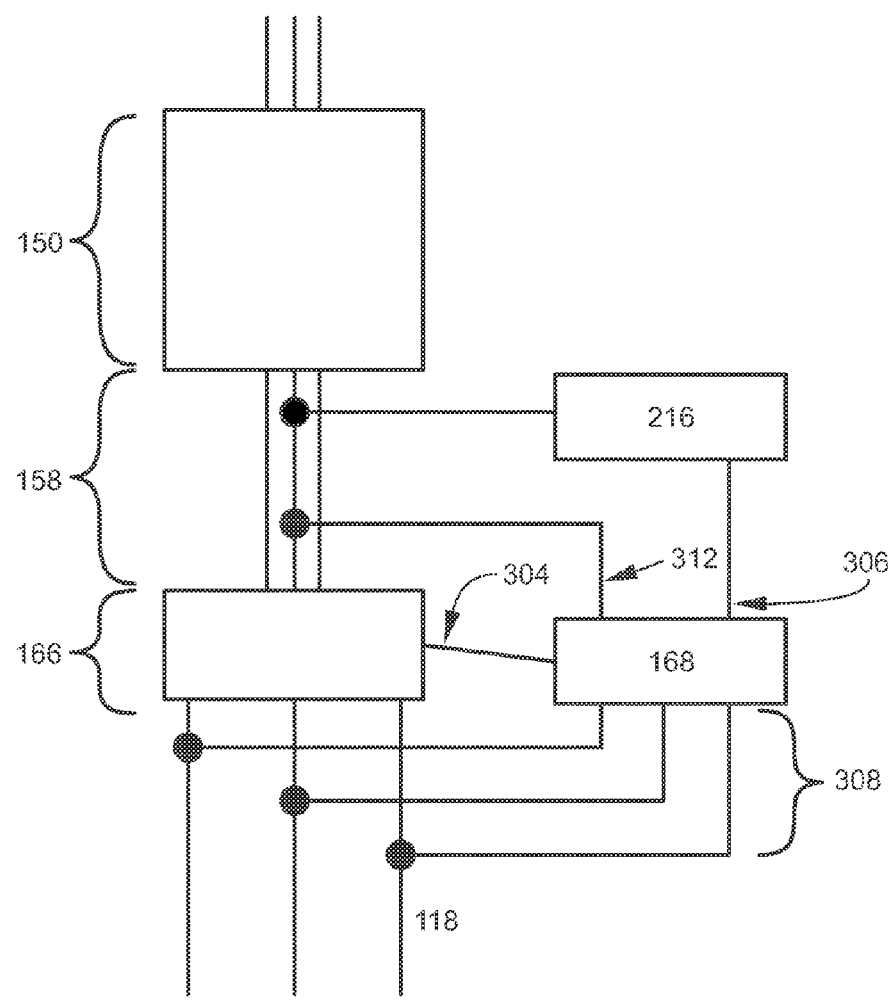
FIG. 4 shows a portion of a network including an additional source of power for the relays that control the network protectors.

FIG. 4 shows the drawing from FIG. 2 but with an additional connection 312 for the relay 168 to obtain power from at least one phase on the secondary side 158 of the transformer 150 and before the network protector 166. The particular phase used to provide power via connection 312 is not central to this disclosure as any of the three phases may be used.

In order to show the added connection 312, the diagram has been expanded in that section. One of skill in the art will appreciate that these diagrams used to illustrate relevant connections are not representative of the length of the connectors between components.

The impact of this change means that the process of reviving a dead network now allows the relay 168 downstream of the one transformer 150 that is energized, to boot and make a decision on whether to close the network protector 166. The energized relay 168 and energized transmitter 216 may convey information to a remote location on various parameters known to the relay 168. The energized transmitter 216 may receive commands from a remote location and provide the commands to the energized relay 168. Thus, the network protector 166 may be closed by the relay 168 into a dead network by remote command.

Revised Process to De-Energize and Re-Energize.

Figure 5:
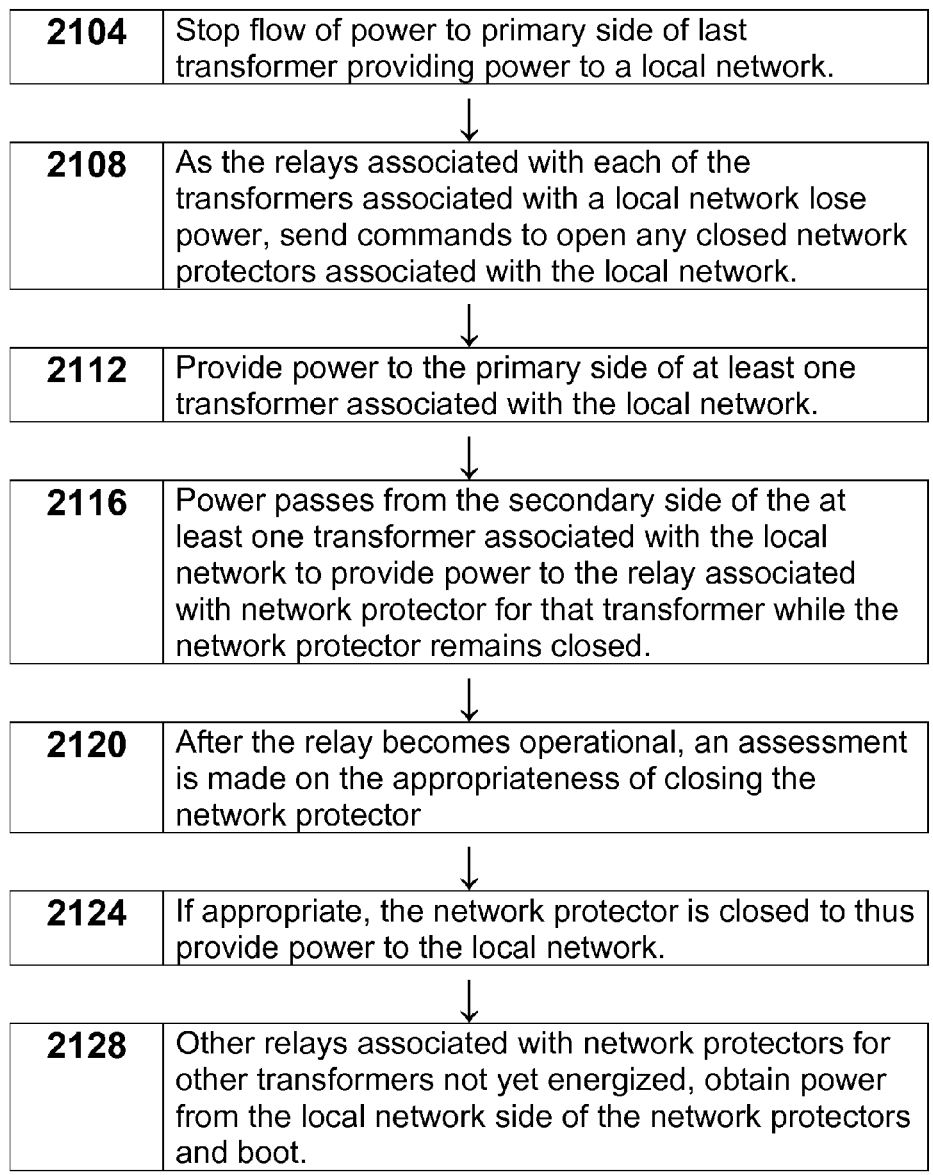
FIG. 5 is a flow chart showing a process of de-energizing and re-energizing a local network where the relay is energized while the associated network protector is still open.

Thus, the process of de-energizing and re-energizing a local network 116 may be implemented as shown in the flowchart in FIG. 5.

Figure 1:
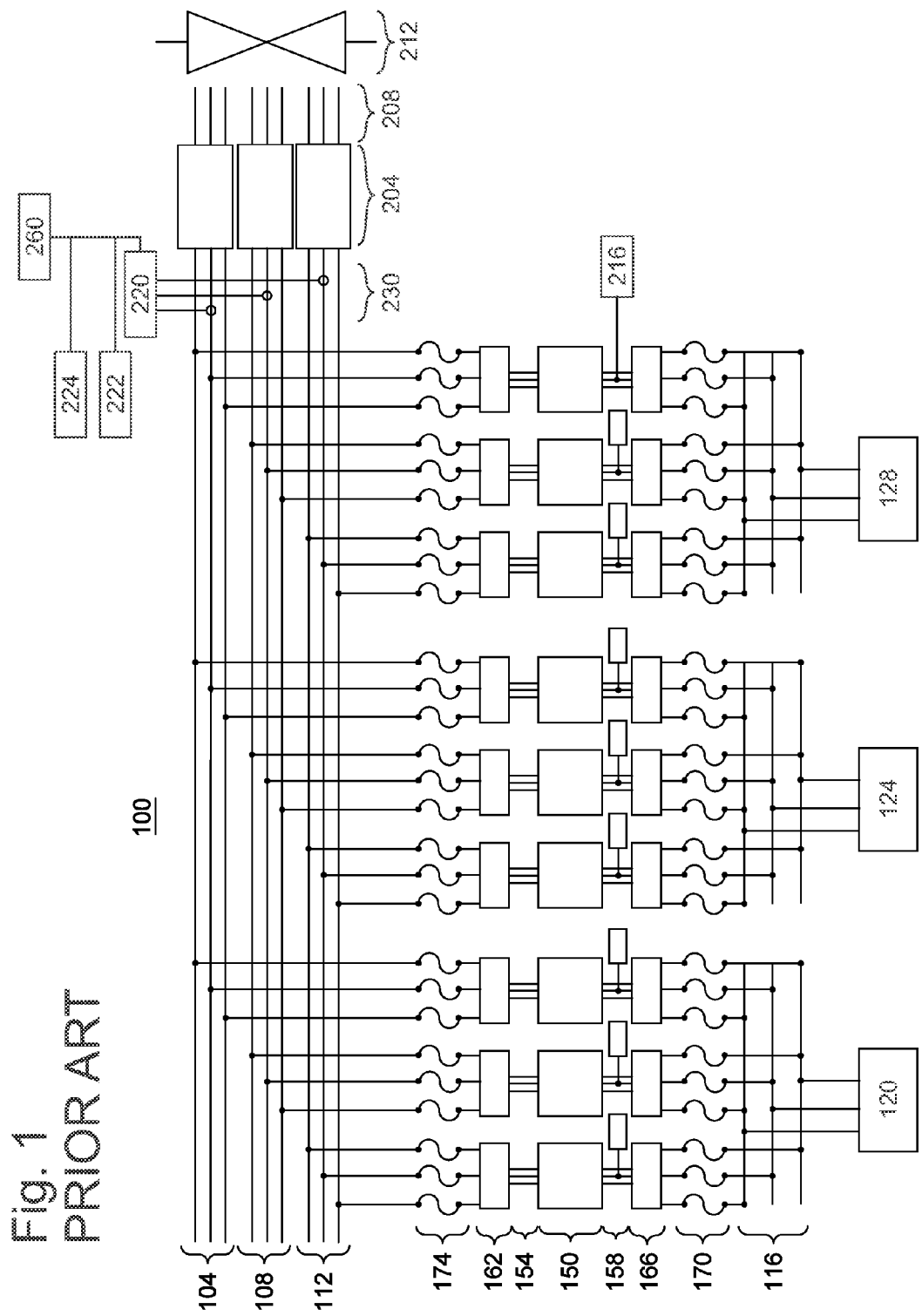
FIG. 1 introduces the relevant components in a prior art electrical distribution network and the devices used to convey information about components to a remote monitoring station.

Step 2104—Stop flow of power to primary side 154 of last transformer 150 providing power to a local network 116. This may be done by opening the relevant transformer breaker 162 (FIG. 1).

Step 2108—As the relays 168 associated with each of the transformers 150 associated with a local network 116 lose power, send commands to open any closed network protectors 166 associated with the local network 116.

Step 2112—Provide power to the primary side 154 of at least one transformer 150 associated with the local network 116.

Step 2116—Power passes from the secondary side 158 of the at least one transformer 150 associated with the local network 116 to provide power to the relay 168 associated with network protector 166 for that transformer 150 while the network protector 166 remains open.

Step 2120—After the relay 168 associated with the energized transformer 150 becomes operational; an assessment is made on the appropriateness of closing the network protector 166 to energize the local network 116.

Step 2124—If appropriate, the network protector 166 is closed by the relay 168 to thus provide power from the energized transformer 150 to the local network 116.

Step 2128—Other relays 168 associated with network protectors 166 for other transformers 150 not yet energized, obtain power from the local network side 118 of the network protectors 166 and boot to become operational.

Notice, that the relay 168 may communicate the reason for not closing the network protector 166 via the transmitter 216 which can communicate through the energized transformer 150. Alternatively, the relay 168 may communicate the reason for not closing the network protector 166 through some other communication path including fiber optic communication, and various wired and wireless communication options including telephone lines and wireless radio.

Thus, a relay 168 may be operated to send an open command (also known as trip) to the associated network protector 166 whenever the relay 168 loses power. This allows the relay 168 to boot and make an informed decision before closing a network protector 166 once power is provided to the relevant transformer 150.

Examples of Assessments Made Before Closing the Network Protector

Respecting a BLOCK OPEN Command.

With a relay 168 that boots up and before closing a network protector 166, the relay 168 can review stored information and adhere to a BLOCK OPEN command provided to the relay 168 to not close the network protector 166 until the BLOCK OPEN command is rescinded with an unblock command. The BLOCK OPEN command may be have provided because equipment needs maintenance or for some other reason. The relay 168 is attentive to other commands such as trip or "Relax Open".

Checking for Cross Phased Cables

A booted and functional relay 168 can check the relative phase relationships of the energized cables on the transformer side of the network protector 166 to ensure that the phase relationship is consistent with the gross historical relationships. This will detect cables that were connected across phases when they were replaced during maintenance.

By having the relay 168 booted and functional, a crossed phase set of cables on the network side 118 of the network protector 166 may be detected as soon as the network protector 166 closes and provides power to the local network 116. By providing power to the relay 168 before closing the network protector 166, the relay 168 can act to quickly open the network protector 166 until the phase issues can be corrected.

Communications with Sub-Station.

By powering up the relay 168 before closing the controlled network protector 166, the relay 168 may gather information which is relevant to assessing local conditions and convey that via power line carrier or some other communication channel to a control station at a sub-station or some other location. Conversely, applying power to the relay 168 and waiting for the relay 168 to become fully functional before closing the network protector 166 allows remote commands from power line carrier, wired, or fiber communication to interact with the relay 168.

Connections for GE Power for 125 v/216 v Service.

Figure 6:
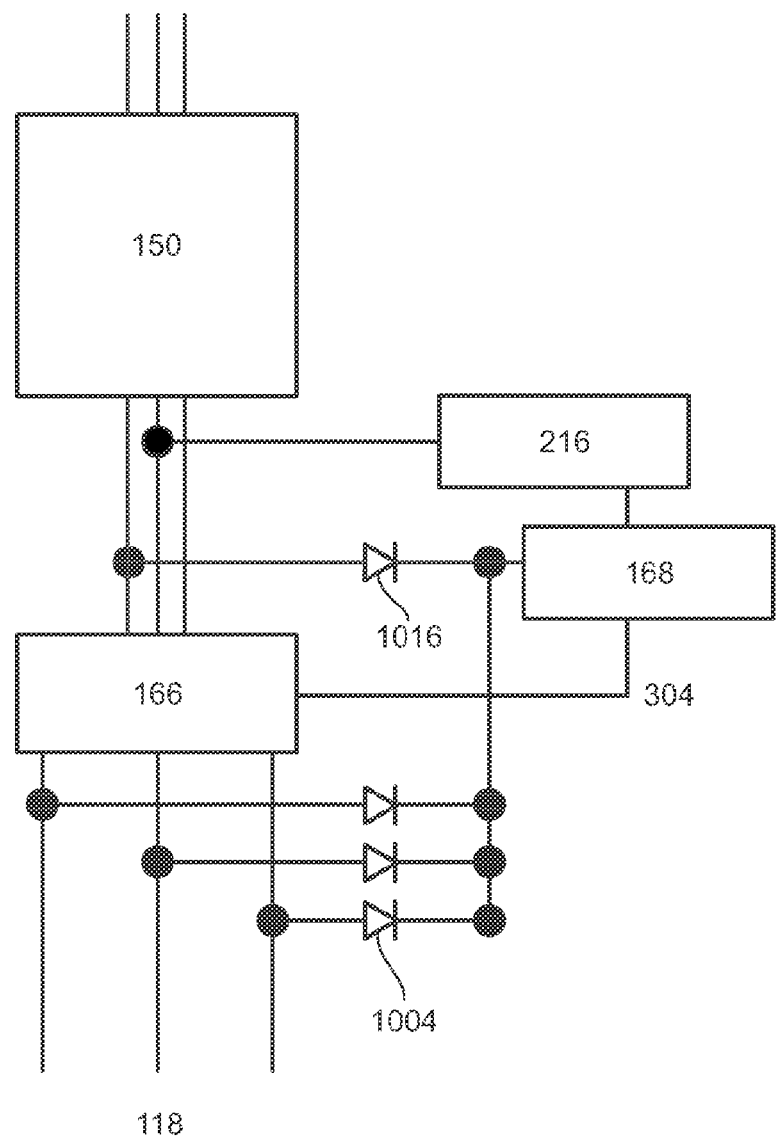
FIG. 6 shows a transformer side power source for use by the relay.

Those of skill in the art know that there is a longstanding split in conventions between Westinghouse type equipment and General Electric type equipment. Turning to FIG. 6, various components of interest are shown in limited detail. In the world of GE type equipment the connections between a relay and the network protector 166 typically had a trip connection, a close connection, and a common The common was actually connected to one of the three phases between the transformer 150 and the network protector 166. The connection was frequently to the A phase but any of the three phases will work for the purpose of providing power to the relay 168. Thus, this legacy connection that was not used to provide power to the relay 168 may be repurposed. Thus, the three phases on the network side 118 of the network protector 166 and the one phase on the transformer side of the network protector 166 can all be connected together as all four points have 125 v/216 v service. One of skill in the art knows that for three phase service, the voltage may be described by phase to ground (125 v) or phase to phase (216 v) or both to be absolutely clear.

A set of diodes 1004 on the local network side and a diode 1016 on the transformer side may be used to limit power flow in one direction so that a bypass is not established around the network protector 166. Those of skill in the art will recognize that the single element diodes may be replaced by a set of components that serves to limit the flow of power in the desired direction. While it is likely that the three diodes 1004 are the same components, diode 1016 may be implemented differently than diodes 1004.

Connections for GE Power for 277 v/480 v Service.

For a local network that is operated at 277 v/480 v and using 125 v power for the relay 168, taking power from either side of the network protector 166 would be a problem unless there was a voltage reduction unit. As it was part of the prior art to provide power to relay 168 from the network side 118 of the network protector 166, the prior art already provides a voltage reduction unit 1012. Those of skill in the art will recognize that there are many known ways to reduce voltage including the use of transformers and various voltage regulators. It is not relevant for purposes of this present disclosure which is used.

Those of skill in the art will recognize that for a relay that is operated with 277 volt inputs, the diagram for use of such a relay in a 277 v/480 v system may be implemented in a manner such as shown in FIG. 6 without voltage reduction from 277 volts to 125 volts.

Voltage Reduction Unit.

Figure 7:
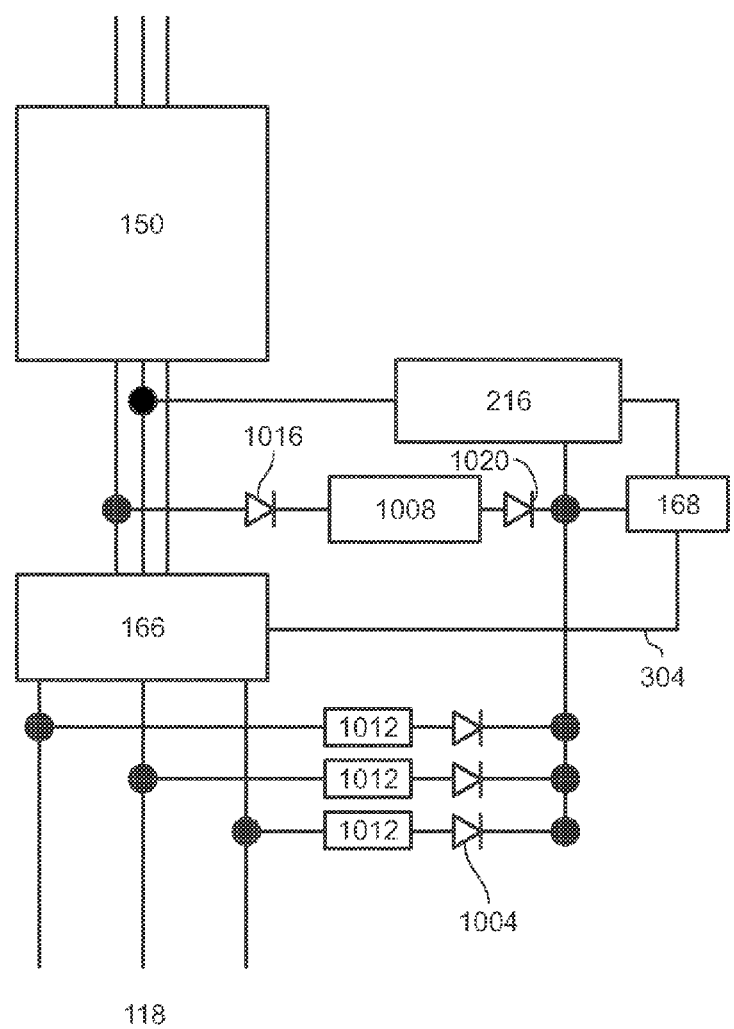
FIG. 7 shows a power connection to the transformer side of the network protector including a voltage reduction unit.

As shown in FIG. 7, to add the capacity to obtain power from the transformer side of the network protector 166, a voltage reduction unit 1008 is added. The type of voltage reduction unit 1008 used for voltage reduction unit 1008 may be the same type used in voltage reduction unit 1012 or may be a different type. The voltage reduction unit 1008 may be integrated into the housing of relay 168. Diode 1016 is on the inlet side of the voltage reduction unit 1008 and diode 1020 is on the outlet side of voltage reduction unit 1008 to prevent backfeed into the voltage reduction unit 1008. The power input to the relay 168 can be though any conventional port type such as a connector pin and socket combination.

One of skill in the art will appreciate that if a relay 168 has an integrated voltage reduction unit 1008 and is placed in service with a 125 v/216 v system, then the voltage reduction unit will not have any reducing to do and the power will flow through the voltage reduction unit 1008 without substantial changes.

Use of Network Voltage Detector and Shutoff

Figure 8:
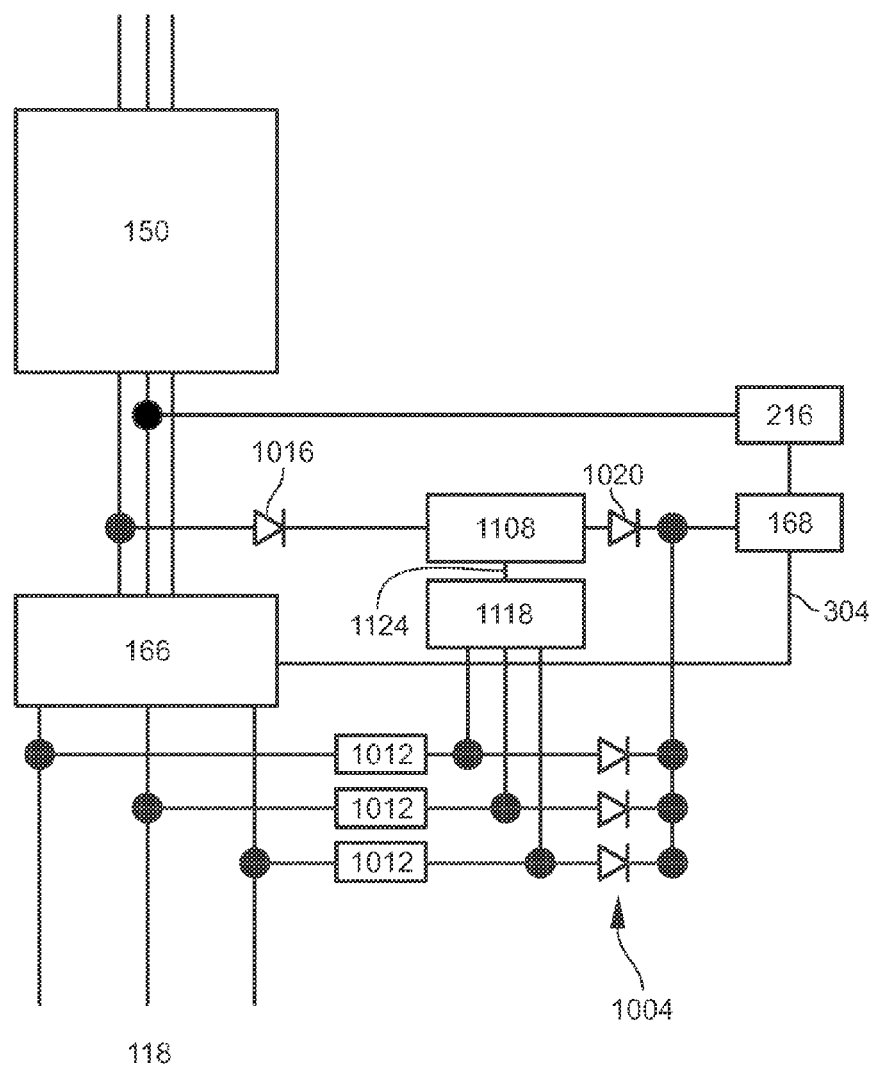
FIG. 8 shows a power connection on the transformer side of then network protector with a network voltage detector that turns off the voltage reduction unit when power is available from the network side of the network protector.

The operation of the voltage reduction unit 1008 reducing voltage of power taken from the transformer side of the network protector 166 is not necessary if there is already power from the network side 118 of the network protector 166. As operation of a voltage reduction unit 1008 will give off heat, the components in FIG. 8 have added functionality to turn off this voltage reduction unit 1108 when the voltage reduction unit 1108 is not needed. As most of the time, the local network is not dead, most of the time, the voltage reduction unit 1008 is not needed.

A network voltage detector 1118 can use any conventional measures to ascertain that at least one phase of the network on the network side 118 of the network protector 166 is energized. If at least one phase is energized, then the network voltage detector 1118 causes voltage reduction unit 1108 to shutoff. When all three phases of the network on the network side 118 of the network protector 166 are no longer energized, the network is dead and the network voltage detector 1118 ceases inhibition of the voltage reduction unit 1108 with shutoff. Thus, whenever the network goes dead, the relay 168 receives power from the transformer side of the network protector 166, if power is available.

Note the voltage detector 1118 inputs need to be connected on the local network side of the diodes 1004 so that the diodes 1004 isolate the voltage detector 1118 from the voltage that passed through diode 1020 after voltage reduction unit 1108.

Diode 1020 keeps power that passes through diodes 1004 from feeding back into the circuitry of the voltage reduction unit 1108.

The legal limitations of the scope of the claimed invention are set forth in the claims that follow and extend to cover their legal equivalents. Those unfamiliar with the legal tests for equivalency should consult a person registered to practice before the patent authority which granted this patent such as the United States Patent and Trademark Office or its counterpart.

What is claimed is:

1. A relay for control of a network protector located on a low voltage side of a transformer with a set of three phases:
   the relay having a set of at least one input port to receive power from at least one of the set of three phases on a network side of the network protectors, wherein power provided from the network side of the network protector is available for operation of the relay; and
   the relay providing power to a communication device that communicates information about the transformer and the network protector to a remote location;
   wherein the improvement comprises:
   at least one route for power to be provided to the relay from at least one of the set of three phases taken from a power source side of the network protector so that the relay has power and is functional before the network protector is closed to provide power into a dead network;
   the at least one route for power including a voltage reduction unit to reduce a voltage of power received from the power source side of the network protector;
   wherein the voltage reduction unit is turned off by a network voltage detector upon detecting that at least one phase on the network side of the network protector is energized; and
   the communication device transmits information from the relay connected to the dead network before any network protector is closed.

2. The relay of claim 1 wherein power cannot flow from the at least one of the set of three phases taken from the power source side of the network protector to the at least one of the set of three phases on the network side of the network protector to bypass the network protector.

3. The relay of claim 1 wherein the communication device receives information from the remote location so that a command generated at the remote location, transmitted to the communication device, passed to the relay, is executed before any network protector is closed to allow power to energize the dead network.

4. The relay of claim 1 wherein the relay and the communication device are within one housing and the communication device uses power line carrier.

5. The relay of claim 1 wherein the relay and the communication device are within one housing and the communication device uses optical fiber.

6. The relay of claim 1 wherein the relay and the communication device are within one housing and the communication device uses telephone line.

7. The relay of claim 1 wherein the relay and the communication device are within one housing and the communication device uses wireless radio.

8. A process to de-energize and re-energize a local network,
   the local network fed by a set of at least one transformer connected to the local network through a network protector;
   the network protector selectively operating:
   in a closed state to pass power from the transformer to the local network; or
   in an open state when the transformer is isolated from the local network,
   the network protector receiving inputs from a relay that changes the network protector from the closed state to the open state;
   the network protector receiving inputs from the relay that changes the network protector from the open state to the closed state;
   the relay providing power to a communication device that communicates information received from the relay to a remote location;
   the relay having access to at least one source of power on a local network side of the network protector and to at least one source of power on a power source side of the network protector;
   the process comprising:
   stop providing power to the local network by stopping power to a last transformer providing power to the local network;
   as the local network ceases to have power, all relays for network protectors connected to the local network send a signal to the network protector to go from the closed state to the open state;
   provide power to a primary side of a first transformer feeding the local network, wherein the first transformer is not required to be the last transformer providing power to the local network before stopping provision of power to the local network;
   energize a first relay with power obtained between a secondary side of the first transformer and a first network protector connected to the first transformer, the first network protector in an open state; the power used to energize the first relay passing through a voltage reduction unit to reduce a voltage of power received from between the secondary side of the first transformer and the first network protector;
   close the first network protector after receipt of input to the first network protector from the first relay;
   turn off the voltage reduction unit after a network voltage detector detects that at least one phase on the local network side of the first network protector is energized; and
   energize any other relays connected to the local network with power from the local network.

9. The process of claim 8 wherein the input to the first network protector from the first relay is delayed while the first relay assesses appropriateness of closing the first network protector based upon a set of data from local instruments.

10. The process of claim 8 wherein the input to the first network protector from the first relay to close the first network protector conveys a command from the remote location received by a first communication device and provided to the first relay wherein the first communication device is provided power by the first relay and becomes energized before the local network is energized.

* * * * *

UNITED STATES PATENT AND TRADEMARK OFFICE
CERTIFICATE OF CORRECTION

PATENT NO. : 9,641,220 B2  
APPLICATION NO. : 14/193754  
DATED : May 2, 2017  
INVENTOR(S) : Papson et al.

Page 1 of 1

It is certified that error appears in the above-identified patent and that said Letters Patent is hereby corrected as shown below:

In the Claims

Column 9, Line 20, Claim 1 'protectors' should read -protector-.

Signed and Sealed this  
Fifth Day of September, 2017

Joseph Matal  
*Performing the Functions and Duties of the*  
*Under Secretary of Commerce for Intellectual Property and*  
*Director of the United States Patent and Trademark Office*